United States Patent
Sudbrink et al.

(10) Patent No.: US 10,091,922 B2
(45) Date of Patent: Oct. 9, 2018

(54) AGRICULTURAL IMPLEMENT SLIDING HITCH

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 80 days.

(21) Appl. No.: 15/258,286

(22) Filed: Sep. 7, 2016

(65) Prior Publication Data

US 2018/0064021 A1 Mar. 8, 2018

(51) Int. Cl.
*A01B 73/06* (2006.01)
*A01B 59/00* (2006.01)
*A01B 59/042* (2006.01)
*A01B 73/04* (2006.01)
*B60D 1/54* (2006.01)
*A01B 49/02* (2006.01)

(52) U.S. Cl.
CPC .......... *A01B 59/004* (2013.01); *A01B 59/042* (2013.01); *A01B 73/048* (2013.01); *A01B 73/065* (2013.01); *B60D 1/54* (2013.01); *A01B 49/02* (2013.01)

(58) Field of Classification Search
CPC .............................. A01B 73/06; A01B 73/065
USPC ........................................................ 172/679
See application file for complete search history.

(56) References Cited

U.S. PATENT DOCUMENTS

| | | | |
|---|---|---|---|
| 3,399,909 A | | 9/1968 | Ambrose |
| 3,623,501 A | | 11/1971 | Reimbold |
| 3,776,367 A | | 12/1973 | Grove |
| 3,809,180 A | * | 5/1974 | Grove ....................... B66C 1/68 182/129 |
| 4,360,077 A | | 11/1982 | Abbott |
| 4,588,347 A | * | 5/1986 | Murta ................... B66C 23/701 212/276 |
| 4,620,339 A | * | 11/1986 | Shepheard .............. B64F 1/305 138/114 |
| 4,694,577 A | | 9/1987 | van der Merwe et al. |
| 4,715,077 A | * | 12/1987 | Shepheard ............ B64F 1/3055 138/114 |
| 4,789,120 A | * | 12/1988 | Spidel ................... B66F 11/046 182/141 |

(Continued)

FOREIGN PATENT DOCUMENTS

| | | |
|---|---|---|
| EP | 1 475 344 A1 | 11/2004 |
| EP | 2 781 482 A1 | 9/2014 |

*Primary Examiner* — Matthew D. Troutman
(74) *Attorney, Agent, or Firm* — Rebecca L. Henkel; Rickard K. DeMille

(57) ABSTRACT

A pull hitch assembly for an agricultural implement having a tool bar coupled with and extending transverse to the pull hitch assembly. The pull hitch assembly includes first and second tube members, a hose carrier track and a tunnel. The second tube member is partially slidingly disposed within the first tube member. The hose carrier track is operatively coupled to both the first tube member and the tube second member. The tunnel is coupled to the first tube member. At least part of the hose carrier track is movable within the tunnel as the first tube member and the second tube member are moved relative to each other.

16 Claims, 7 Drawing Sheets

(56) References Cited

U.S. PATENT DOCUMENTS

| | | | |
|---|---|---|---|
| 5,031,704 A | 7/1991 | Fleischer et al. | |
| 5,255,756 A | 10/1993 | Follmer et al. | |
| 5,718,345 A | 2/1998 | Hade, Jr. | |
| 5,924,837 A | 7/1999 | Passmann | |
| 6,530,742 B2 * | 3/2003 | Trinler | B66C 13/14 |
| | | | 212/348 |
| 6,561,535 B1 * | 5/2003 | Paluch | A01B 59/042 |
| | | | 172/272 |
| 6,948,301 B2 | 9/2005 | Rowse et al. | |
| 7,017,676 B2 * | 3/2006 | Neufeld | A01B 73/005 |
| | | | 172/452 |
| 7,090,086 B2 | 8/2006 | Dupre et al. | |
| 7,143,839 B2 * | 12/2006 | Neufeld | A01B 59/042 |
| | | | 172/776 |
| 7,182,146 B2 * | 2/2007 | Erickson | A01B 59/042 |
| | | | 172/776 |
| 7,360,662 B2 * | 4/2008 | Montineri | B66C 23/701 |
| | | | 212/349 |
| 7,540,139 B2 | 6/2009 | Rowse et al. | |
| 2008/0110650 A1 | 5/2008 | Martin et al. | |

* cited by examiner

AGRICULTURAL IMPLEMENT SLIDING HITCH

BACKGROUND OF THE INVENTION

1. Field of the Invention

The present invention relates to agricultural implements, and, more particularly, to agricultural implements having a sliding tube hitch member.

2. Description of the Related Art

Farmers utilize a wide variety of implements including tillage implements to prepare soil for planting and planting implements for the planting of seeds. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As tillage implements become wider and wider over time, it becomes more difficult to keep the transport size of the implement within manageable limits. It also becomes more difficult to convert the tillage implement from an operating mode to a transport mode, or vice versa, without requiring too much time and difficulty on the part of the operator. It is desirable for the tillage implement to be converted from one mode to the other while the operator remains within the operator cab, through the use of hydraulics or other actuators. It is also desirable for the tillage implement to remain within certain geometric constraints so that it is not necessary to use a separate "escort vehicle" or the like when traveling on public roads.

One way in which implements are able to transform between a transport mode and an operational mode involve the use of a telescoping hitch arrangement. The hydraulic and electrical connections have to be arranged to accommodate the sliding of the hitch components. A track system is often used to consolidate and accommodate the movement of the hoses. A problem often encountered is an interference in the movement of the track system.

What is needed in the art is a track system that will accommodate and protect the track relative to the hitch of an implement.

SUMMARY OF THE INVENTION

The present invention provides a shielded carrier track on a pull hitch.

The invention in one form is directed to a pull hitch assembly for an agricultural implement having a tool bar coupled with and extending transverse to the pull hitch assembly. The pull hitch assembly includes first and second tube members, a hose carrier track and a tunnel. The second tube member is partially slidingly disposed within the first tube member. The hose carrier track is operatively coupled to both the first tube member and the tube second member. The tunnel is coupled to the first tube member. At least part of the hose carrier track is movable within the tunnel as the first tube member and the second tube member are moved relative to each other.

The invention in another form is directed to an agricultural implement including a pull hitch tube having a first member and a second member at least partially slidingly disposed within the first member, the pull hitch extending in a travel direction. A tool bar is coupled with and extends transverse to the pull hitch tube. A hose carrier track is operatively coupled to the first member and the second member. A tunnel is coupled to the first member. The hose carrier track is movable within the tunnel as the first member and the second member are moved relative to each other.

An advantage of the present invention is that the tunnel shields the hose carrier track from dirt and debris.

Another advantage is that the guide channel supports and guides the movement of the hose carrier track so that it does not rub or catch on itself.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
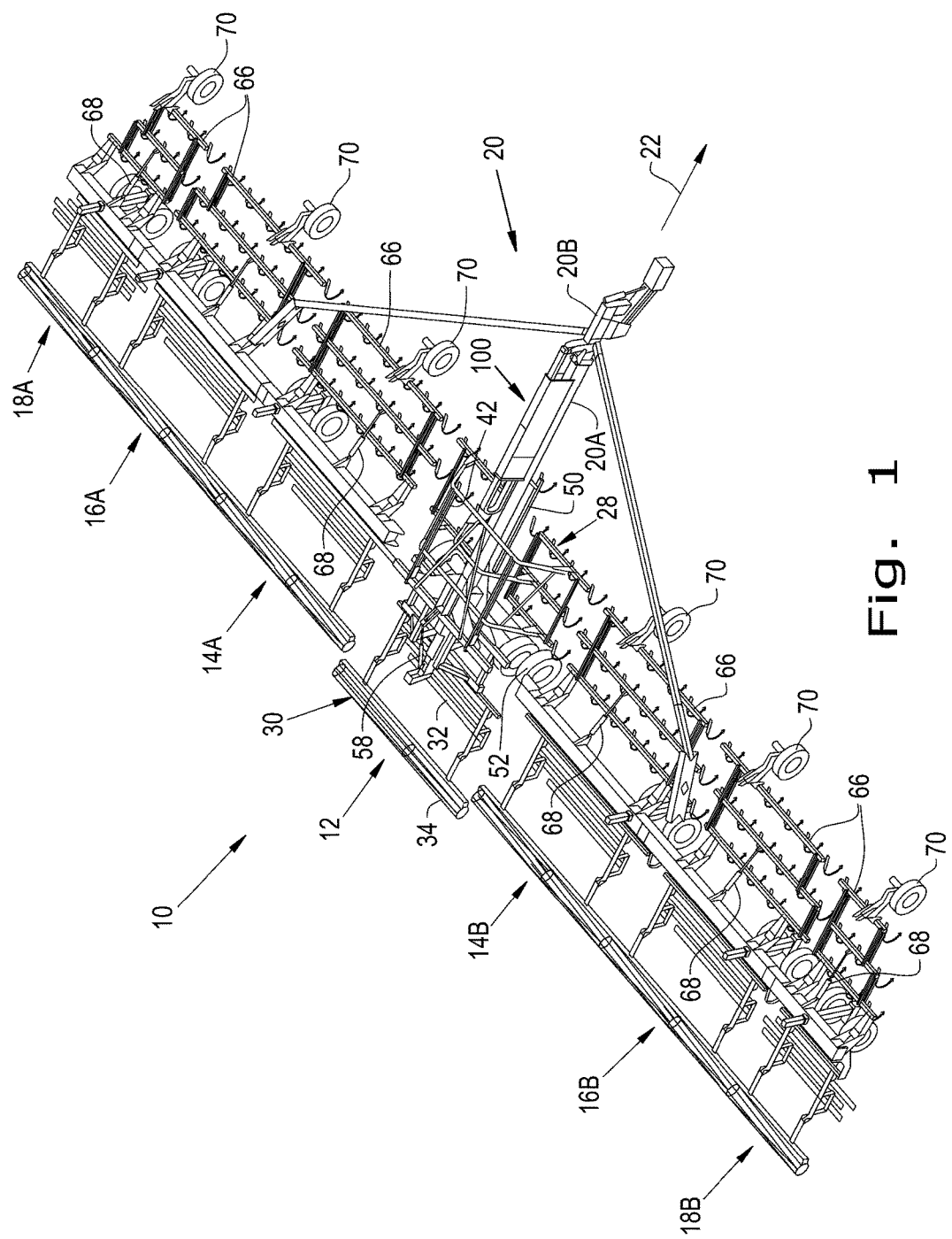
FIG. 1 is a top perspective view of an agricultural tillage implement in the form of a field cultivator, having an embodiment of a track guidance system of the present invention incorporated thereon.

Referring now to the drawings, and more particularly to FIGS. 1-7, there is shown an embodiment of an agricultural implement 10 using a track guidance system 100 of the present invention. In the illustrated embodiment, implement 10 is in the form of a field cultivator 10 for tilling and finishing soil prior to seeding.

Field cultivator 10 is configured as a multi-section field cultivator, and includes a main frame section 12 and a plurality of wing sections 14, 16 and 18. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections.

Main frame section 12 is the center section that is directly towed by a traction unit, such as an agricultural tractor (not shown). Main frame section 12 includes a pull hitch tube 20 extending in a travel direction 22. Pull hitch 20 has a first tube member 20A and a second tube member 20B. Pull hitch 20 along with track guidance system 100 can be considered a pull hitch assembly 20 that can be used in conjunction with any implement using an extending/retracting pull hitch.

Figure 2:
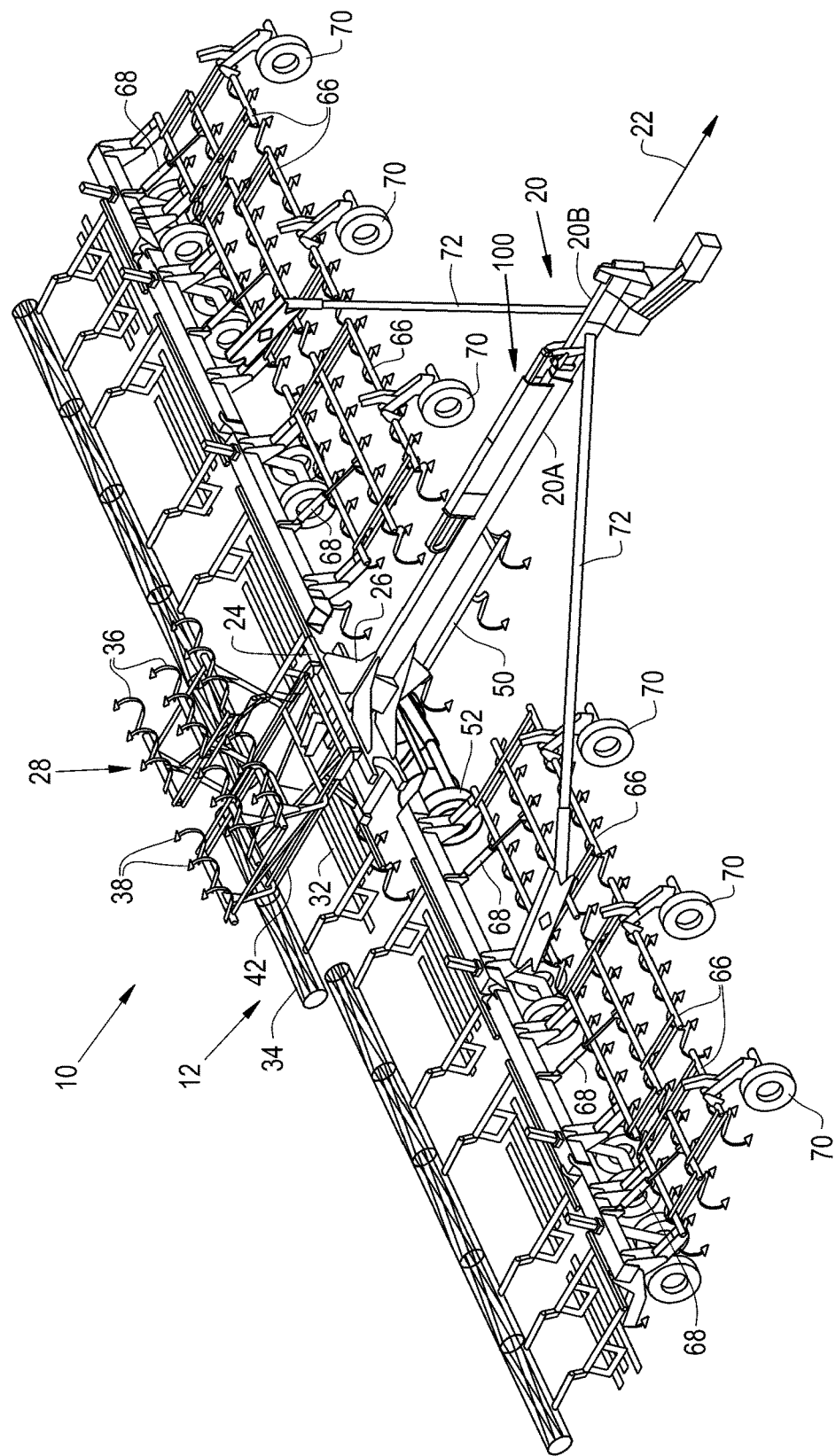
FIG. 2 is the same top perspective view shown in FIG. 1, with the center shank frame folded to a transport position.
Figure 3:
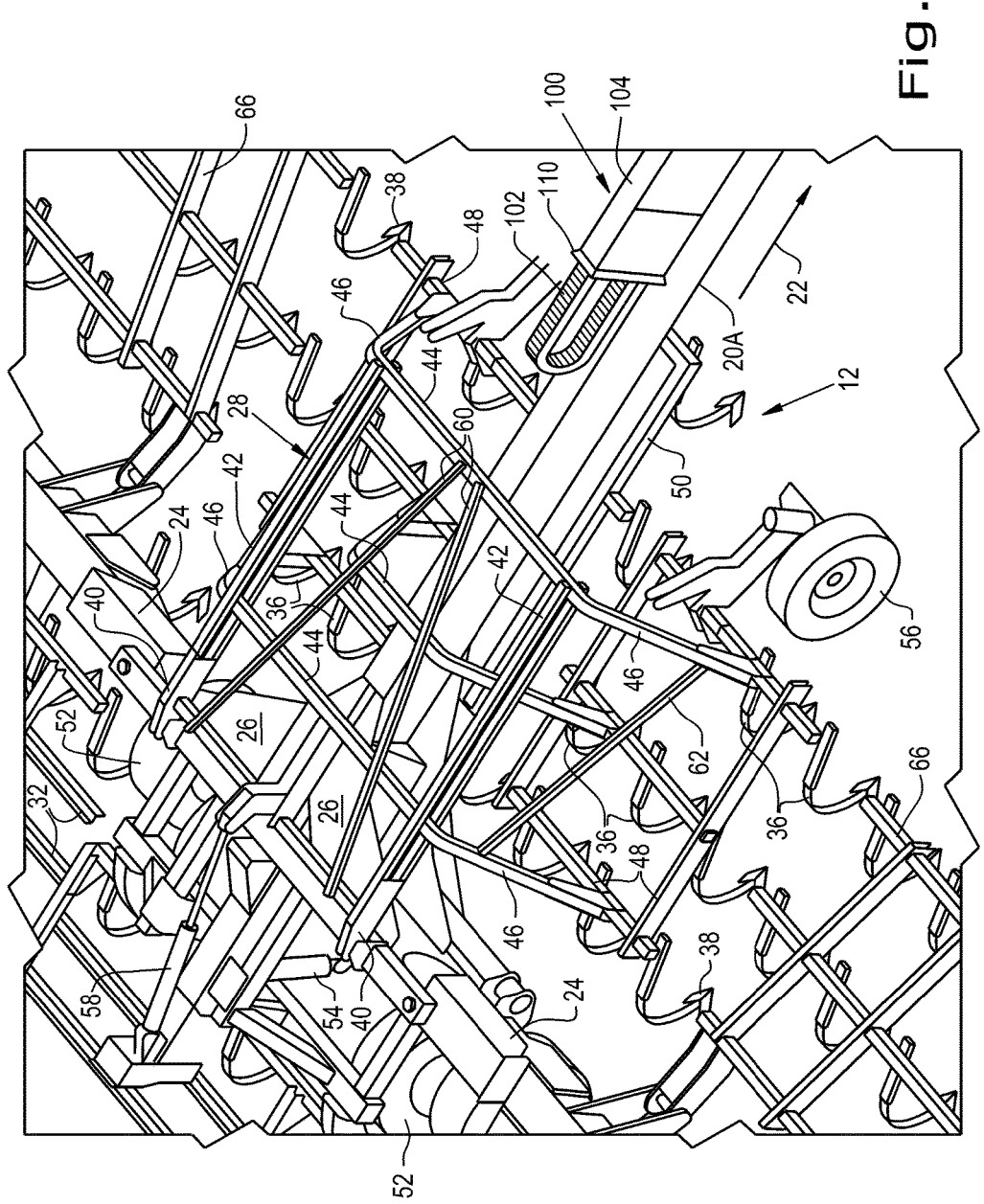
FIG. 3 is a top perspective view of the center frame section with the center shank frame in the operating position showing one portion of the track guidance system of FIGS. 1 and 2.

A tool bar 24 is coupled with and extends transverse to pull hitch tube 20 (FIGS. 2 and 3). Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling basket 34 which coact with each other to finish the soil. However, rear auxiliary implement can be differently configured, such as a spike tooth drag, cultivator shanks, etc.

Figure 4:
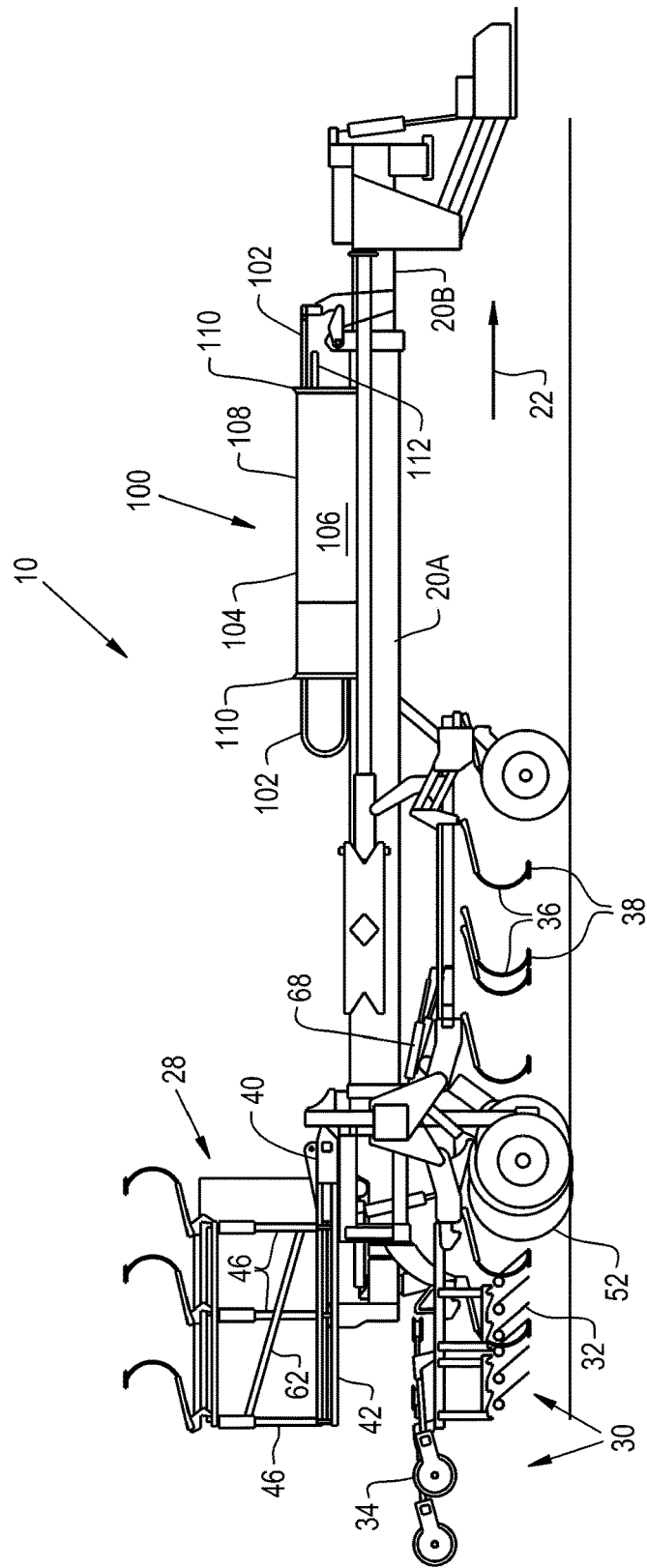
FIG. 4 is a side view of the tillage implement shown in FIGS. 1-3, illustrating a side view of the track guidance system of FIGS. 1-3.
Figure 5:
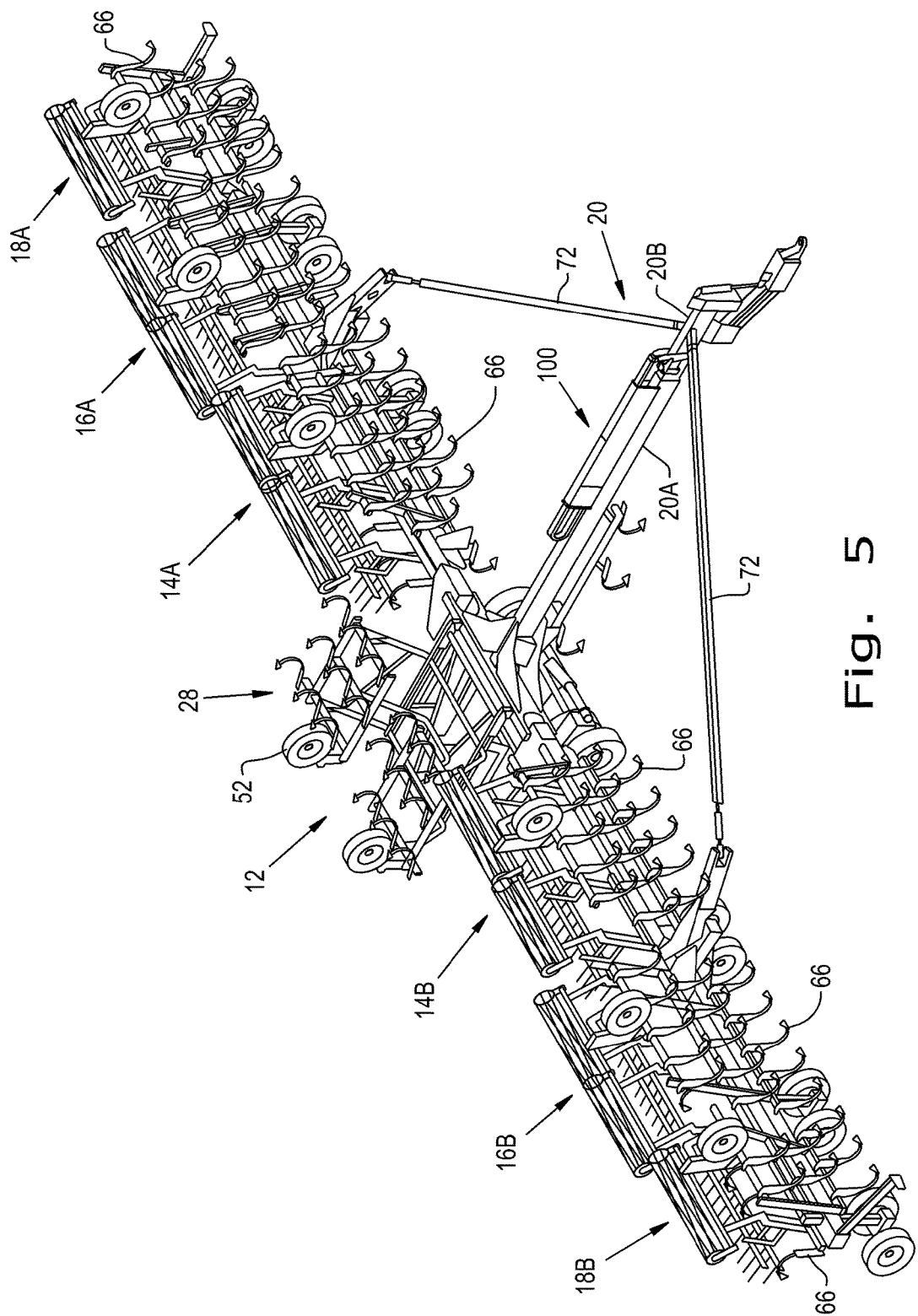
FIG. 5 is a top perspective view of the tillage implement shown in FIGS. 1-4, with the center shank frame folded rearward to a transport position and the wing section shank frames folded upwards to a transport position, with the track guidance system thereon.

Shank frame 28 generally functions to carry cultivator shanks 36 with shovels 38 at their lower ends for tilling the soil. Shank frame 28 is pivotally coupled with tool bar 24, preferably at the top of tool bar 24, such as with couplings 40. Shank frame 28 is positioned in front of the tool bar 24 when in an operating position (FIGS. 1 and 3), and is foldable up and over the tool bar 24 to a position rearward of tool bar 24 when in a transport position (FIGS. 2 and 4). Shank frame 28 includes two sets of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating position. The outboard ends 46 of cross frame members 44 are coupled with a pair of respective shank sub-frames 48. Shank sub-frames 48 are spaced apart from each other in a direction transverse to pull hitch tube 20 and are positioned on respective opposite lateral sides of pull hitch tube 20 when in an operating position.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using hydraulic cylinder 54.

Shank frame 28 also includes one or more gauge wheel assemblies 56 which function to level shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. Hydraulic cylinder 58 may optionally be placed in a "float mode" such that gauge wheel assemblies 56 are operable to float up and down as they traverse across a field and thereby set the operating depth at the front edge of shank frame 28.

Shank frame 28 may also include additional support frame members 60 and 62 which provide structural rigidity. Support frame members 60 extend diagonally across the top of shank frame 28, and support frame members 62 extend diagonally between the outboard ends 46 of cross frame members 44.

Figure 6:
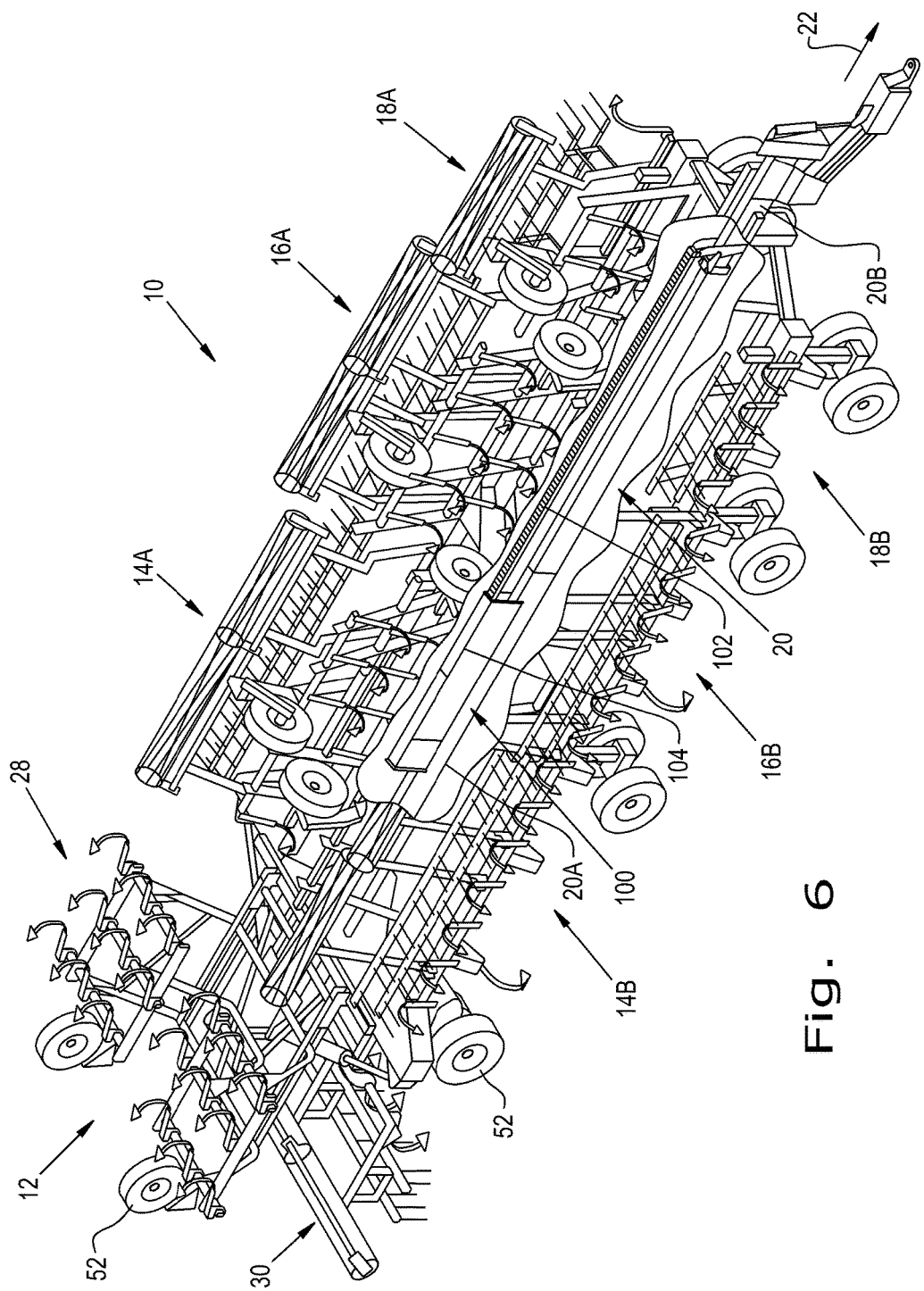
FIG. 6 is a top perspective view of the tillage implement shown in FIGS. 1-5, with the wing sections folded forward to a transport position showing the track extended from the track guidance system.
Figure 7:
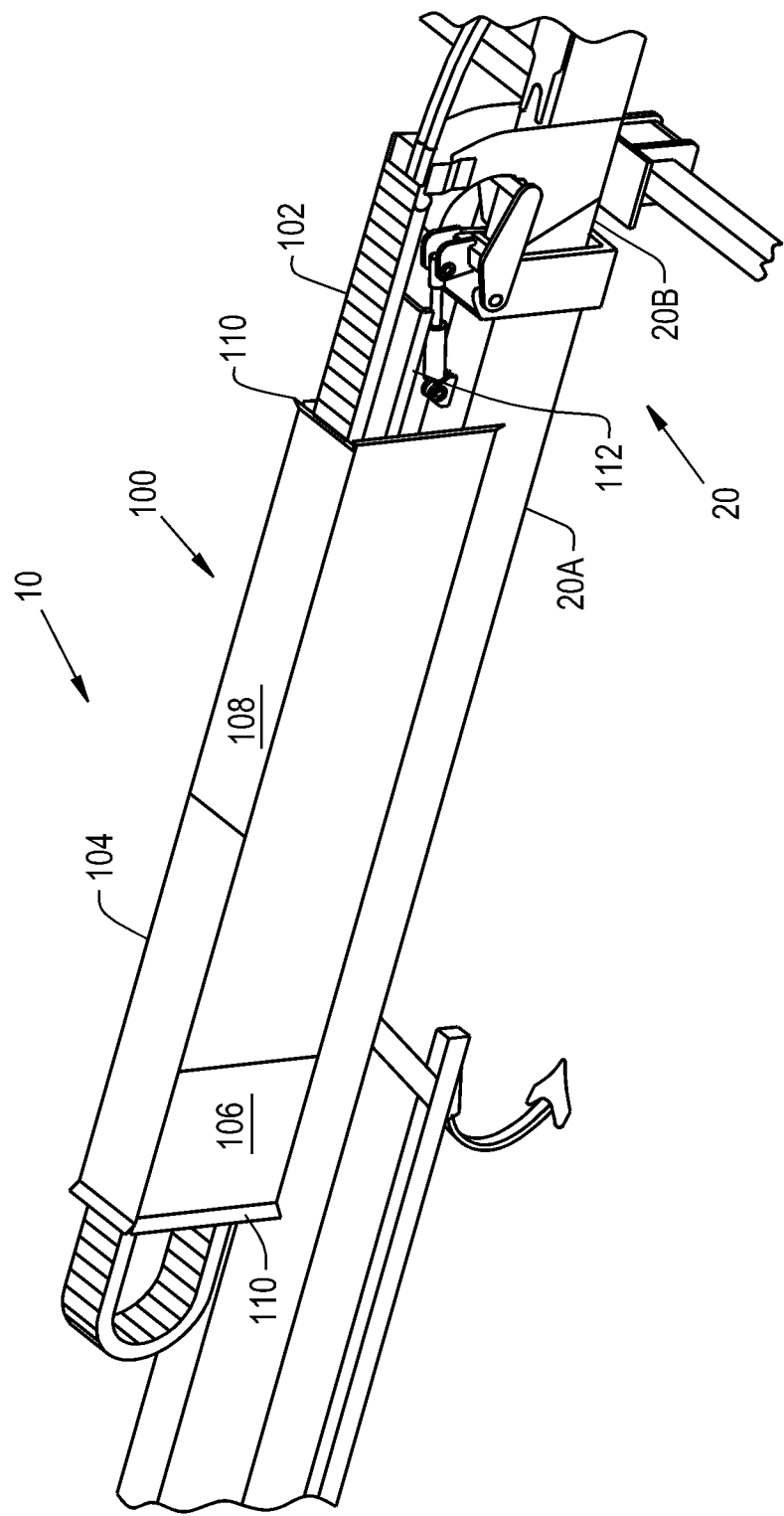
FIG. 7 is a closer view of the track guidance system of FIGS. 1-6.

During use, it is periodically necessary to move the field cultivator 10 from an unfolded (operating) position to a folded (transport) position. Hydraulic cylinder 54 is first actuated to lift the rear lift wheels 52 to the raised transport position. Hydraulic cylinder 58 is then actuated to fold shank frame 28 up and over tool bar 24 to an inverted position rearward of tool bar 24 (FIGS. 2 and 4). Then the shank sections 66 of the wing sections 14, 16 and 18 are folded upwards to a position at or near vertical using hydraulic cylinders 68 (FIGS. 1, 2 and 4). Diagonally angled draft arms 72 extending between a forward end of second member 20B of pull hitch tube 20 and a respective tool bar 24 associated with the pair of middle wing sections 16A and 16B are then folded inward, and wing sections 14, 16 and 18 are then folded forward to a position adjacent pull hitch tube 20 (FIG. 6). This movement is undertaken with second tube member 20B sliding from first tube member 20A and extending in direction 22. Gauge wheel assemblies 56 at the front of center shank frame 28 and gauge wheel assemblies 70 at the front of wing sections 14, 16 and 18 are all configured as caster wheels and are not in contact with the ground when field cultivator 10 is in the folded or transport state.

For unfolding the field cultivator 10 to the operating position, the reverse folding sequence is carried out. At the appropriate time in the reverse sequence pull hitch assembly 20 retracts with second tube member 20B sliding into first tube member 20A. Pull hitch assembly 20 includes first tube member 20A, second tube member 20B, track guidance system 100, and a hose carrier track 102. Track guidance system 100 includes a tunnel 104, having sides 106 a top 108, expanded portions 110 and a guide channel 112.

Hose carrier track 102 is a segmented track arrangement that captivates hydraulic hoses that are used to activate the various actuators of implement 10. Hose carrier track 102 as well as the hydraulic hoses therein are coupled at each end, respectively to first tube member 20A and second tube member 20B. It is also contemplated that hose carrier track 102 may carry electrical conductors. Hose carrier track 102 guides and allows for the orderly movement of the hydraulic hoses while pull tube members 20A and 20B telescopically extend/retract.

Tunnel 104 provides a cover for, and guidance to, hose carrier track 102 to reduce the amount of dirt and debris that may could accumulate in hose carrier track 102. The two ends of tunnel 104 are open with expanded or flared portions 110 being provided to help guide the movement of hose carrier track 102 into tunnel 104. It is also contemplated that the aft end of tunnel 104 could be closed. At the fore end (the end located at the front in the direction of travel 22) of tunnel 104, guide channel 112 is connected between sides 106 to allow the upper loop of carrier track 102 to ride thereon. Channel 112 extends out of the fore end of tunnel 104, but does not extend to or out of the aft end of tunnel 104. The length of channel 112 is selected to be long enough to support hose carrier track 102, but not so long as to restrict its movement within tunnel 104 when pull tube hitch assembly 20 is fully extended.

Tunnel 104 is basically rectangular in overall shape and appearance having a width that conveniently is matched to the width of first tube member 20A and is attached to, and extends vertically from, member 20A. Tunnel 104 has a length that is generally around half of the length of hose carrier track 102 so that hose carrier track 102 is largely covered by tunnel 104 when member 20B is retracted into member 20A. It is contemplated that other widths and lengths may also be used.

Advantageously the present invention eliminates the accumulation of dirt and moisture in hose carrier track 102, which could become a hardened mass causing the track to bind and/or break when moved.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pull hitch assembly for an agricultural implement including a tool bar coupled with and extending transverse to the pull hitch assembly, the pull hitch assembly comprising:
    a first tube member;
    a second tube member at least partially slidingly disposed within the first tube member;
    a hose carrier track being operatively coupled to the first tube member and the second tube member; and
    a tunnel coupled to the first tube member, at least a part of the hose carrier track being movable within the tunnel as the first tube member and the second tube member are moved relative to each other; and
    wherein the tunnel is open at each end; and
    wherein the tunnel has a width that is generally the same as a width of the first tube member.

2. The pull hitch assembly of claim 1, wherein the tunnel includes an expanded portion on each end of the tunnel.

3. The pull hitch assembly of claim 1, wherein the tunnel has a length, and the hose carrier track has a length that is approximately twice as long as the length of the tunnel.

4. The pull hitch assembly of claim 1, wherein the tunnel has two sides and a top, the two sides being coupled to the first tube member.

5. The pull hitch assembly of claim 4, wherein the tunnel additionally has a channel coupled to the two sides, part of the hose carrier track being supported by the channel.

6. The pull hitch assembly of claim 5, wherein a portion of the channel extends from a fore end of the tunnel.

7. The pull hitch assembly of claim 5, wherein the channel does not extend to a distal aft end of the tunnel.

8. The pull hitch assembly of claim 1, wherein the agricultural implement is a cultivator.

9. An agricultural implement, comprising:
    a pull hitch tube including a first member and a second member at least partially slidingly disposed within the first member, the pull hitch extending in a travel direction;
    a tool bar coupled with and extending transverse to the pull hitch tube;
    a hose carrier track being operatively coupled to the first member and the second member; and
    a tunnel coupled to the first member, the hose carrier track being movable within the tunnel as the first member and the second member are moved relative to each other; and
    wherein the tunnel is open at each end; and
    wherein the tunnel has a width that is generally the same as a width of the first member.

10. The agricultural implement of claim 9, wherein the tunnel includes an expanded portion on each end of the tunnel.

11. The agricultural implement of claim 9, wherein the tunnel has a length, and the hose carrier track has a length that is approximately twice as long as the length of the tunnel.

12. The agricultural implement of claim 9, wherein the tunnel has two sides and a top, the two sides being coupled to the first member.

13. The agricultural implement of claim 12, wherein the tunnel additionally has a channel coupled to the two sides, part of the hose carrier track being supported by the channel.

14. The agricultural implement of claim 13, wherein a portion of the channel extends from a fore end of the tunnel.

15. The agricultural implement of claim 13, wherein the channel does not extend to a distal aft end of the tunnel.

16. The agricultural implement of claim 9, wherein the agricultural implement is a cultivator.

* * * * *